United States Patent [19]

Turoscy et al.

[11] Patent Number: 5,169,539
[45] Date of Patent: Dec. 8, 1992

[54] ORGANOFUNCTIONAL SILANE PAINT COAGULANTS AND DETACKIFIERS

[75] Inventors: Rachel Turoscy, Hatfield; Deborah L. Purnell, Philadelphia, both of Pa.

[73] Assignee: Betz Laboratories, Inc., Trevose, Pa.

[21] Appl. No.: 874,936

[22] Filed: Apr. 28, 1992

[51] Int. Cl.$^5$ .............................................. C02F 1/52
[52] U.S. Cl. .................................. 210/712; 210/723; 210/724; 210/735; 210/930; 55/85; 134/38
[58] Field of Search ............... 210/712, 735, 723, 724, 210/930; 55/85; 134/38

[56] References Cited

U.S. PATENT DOCUMENTS

| | | | |
|---|---|---|---|
| 3,810,843 | 5/1974 | Slusarczuk et al. | 210/735 |
| 4,130,674 | 12/1978 | Roberts et al. | 427/331 |
| 4,600,513 | 7/1986 | Mizutani et al. | 210/712 |
| 4,637,824 | 1/1987 | Pominville | 55/85 |
| 4,854,947 | 8/1989 | Patzelt | 55/85 |
| 4,888,386 | 12/1989 | Huang et al. | 525/57 |
| 4,940,491 | 7/1990 | Huang et al. | 134/38 |
| 5,006,261 | 4/1991 | Huang et al. | 210/930 |
| 5,060,682 | 10/1991 | Merrell | 134/38 |
| 5,076,939 | 12/1991 | Hunter et al. | 210/930 |

Primary Examiner—Stanley S. Silverman
Assistant Examiner—Neil McCarthy
Attorney, Agent, or Firm—Alexander D. Ricci; Steven D. Boyd

[57] ABSTRACT

A method and composition for detackifying or coagulating and flocculating waterborne and solventborne paints with organofunctional silane compounds.

6 Claims, No Drawings

ORGANOFUNCTIONAL SILANE PAINT COAGULANTS AND DETACKIFIERS

FIELD OF THE INVENTION

The present invention relates to improved methods for treating paint wastes and paint oversprays encountered in wet paint spray booths or any area where these wastes or oversprays exist. More particularly, the present invention relates to improved methods which employ organofunctional silane compounds for coagulating and detackifying overspray in paint spray booths.

BACKGROUND OF THE INVENTION

The spray painting of automobile bodies, truck parts, appliances and other industrial goods is typically carried out in enclosed areas called paint spray booths. These booths act to contain solvent fumes and oversprayed paint and reduce the chances of dust contamination in order to protect the paint booth operators and the painted articles. These booths vary in size, but are somewhat basic in their design and operation. A typical booth would thus consist of a work area, back section with mist eliminators and a sump.

The articles to be painted generally pass through the work area while an air flow makes overspray contact either water in the sump or spray from a water curtain. The air is scrubbed with recirculated water at the water curtain, passes through mist eliminators and is removed by an exhaust fan.

Even though paint transfer efficiencies have increased through improved application technologies, roughly one half of all paint sprayed does not reach its intended article. As a result, significant concentrations of paint buildup in the system and agglomeration can occur. When solventborne paints are used, the resultant mass is a sticky, tacky material which can plug mist eliminators, shower heads, and even recirculating pumps. When waterborne paints are employed, they will remain dispersed in the spray booth water. When present, waterborne paints will not present the same problems as untreated solventborne paint (i.e., tackiness, clumps, etc.). However, failure to remove waterborne paints results in increasing COD (carbon oxygen demand) levels, increasing suspended solids, and increasing levels of foam. All of these conditions decrease water quality.

When water quality decreases, scrubbing efficiency decreases leading to potentially hazardous conditions of unchecked paint emissions being discharged into the atmosphere. Such conditions may also present severe safety hazards to paint spray booth operators. The paint solids that are collected in the water can form suspensions which remain tacky and create expensive separation and disposal problems.

It is therefore desirable to treat paint spray booth water systems so as to reduce or prevent, as much as possible, the agglomeration and deposition of oversprayed paint on critical paint spray booth operating parts, to render the resultant sludge (in solventborne systems) non-tacky and easily removable, and to provide a water quality such that it can be recycled for use in the system.

The paint employed in typical paint spray booths fall into two generic classes, waterborne and solventborne. Currently, solventborne paints are predominent. However, increased restrictions upon the levels of volatile organic compound emissions are forcing industrial applications to switch to waterborne paints.

The differences in the two paint classifications can be found in their formulations. Solventborne paint typically consists of organic solvents (such as xylene), resin binders, pigments and additives. In waterborne systems, water is substituted for the organic solvent. Thus, the resin binders, pigments, and additives must all be rendered water soluble or dispersible. Resins which are not watersoluble can be stabilized with emulsifiers and cosolvents or be reformulated.

The behavior of a solventborne and a waterborne paint will differ when each becomes overspray in a wet paint spray booth. Waterborne paints will disperse in the aqueous medium, while solventborne paints agglomerate into a tacky mass and adhere to paint spray booth operating parts. Because of this behavior in water, in the past, the chemical process by which each paint type is treated differs. In order to remove waterborne paint from an aqueous medium, they should be considered as hydrophilic colloids which must be rendered hydrophobic. The stability of the compounds in water arises from the surface charge generated from carboxylic, aliphatic or aromatic hydroxyl groups on the polymer backbone. The process of destabilizing such solutions is termed coagulation. Flocculation follows in this treatment process whereby the destabilized particles are induced to come together, make contact and form large agglomerants.

Solventborne paints are hydrophobic and their treatment involves partially dispersing the paint particles in the aqueous medium via an anionic dispersant. The partially hydrophilic particles can then be treated to render them non-tacky. This process is referred to as detackification.

Numerous paint detackification and coagulation programs are known. Paint overspray removal has been achieved with clays, cationic polyelectrolytes, metal salts, urea, and melamine formaldehyde resins. For example U.S. Pat. No. 4,637,824 (Pominville) discloses a paint spray booth detackifier where the pH of the washwater is adjusted between 7 and 12 by an alkali metal silicate. Pominville requires the addition of an amphoteric metal salt and a polydiallyldimethylammonium halide. Mizutani et al., U.S. Pat. No. 4,600,513 discloses a paint spray booth detackifier consisting of an alkali metal zincate added to the washwater along with a cationic amine. U.S. Pat. No. 5,060,682, Merrell discusses a variety of patents related to detackifiers and is incorporated herein by reference.

U.S. Pat. Nos. 4,940,491 and 4,888,386, Huang discloses a composition and method for detackification of both waterborne and solventborne enamels. The composition comprises a melamine-formaldehyde polymer, polyvinyl alcohol and a styrene acrylate copolymer in a specific range of ratios. U.S. Pat. No. 4,854,947, Patzelt discloses paint detackification using oil-in-water emulsions. U.S. Pat. No. 4,130,674, Roberts discloses an overspray control process which employs a long chain surface active nitrogen derivative and a polyvalent metal salt, nonionic high molecular weight polymer, anionic high molecular weight polymer or a blend of anionic and nonionic polymers.

GENERAL DESCRIPTION OF THE INVENTION

The present invention avoids the above and other problems commonly experienced during the treatment of oversprayed paint in a spray booth environment. The present invention is effective in the treatment of both waterborne and solventborne paints. In the treatment of waterborne paints, the treatment of the present invention has been found to effectively coagulate and flocculate waterborne paints. The treatment of the present invention has also been found to effectively detackify solventborne paints.

The treatment of the present invention comprises organofunctional silanes which were found to be effective detackifiers and coagulants. The organofunctional silanes have been found to be an effective treatment of polyacrylic, polyurethane, epoxy and polyester resin based paints. These paint types can be further classified to include latexes, enamels, lacquers and acrylics.

DETAILED DESCRIPTION OF THE INVENTION

The present invention provides a paint spray booth treatment program which is effective at both detackifying solventborne paints and coagulating/flocculating waterborne paints. It has been discovered that organofunctional silanes are effective paint spray booth treatments in both paint systems. The organofunctional silanes of the present invention may be employed alone or in combination with various compounds such as inorganic bases, acids, and metal salts.

Organofunctional silane compounds are characterized by the general formula: R—SiX$_3$. X is an hydrolyzable alkoxy group (commonly ethoxy or methoxy) which is converted to a silanol group on hydrolysis. R consists of a reactive group substituted on a vinyl or alkyl hydrocarbon. The reactive groups include amine, chloro, mercapto, methacrylate, and epoxy functionalities.

The present inventors had discovered that organofunctional silanes are effective paint spray booth treatments. The preferred organosilanes of the present invention are amine functional organosilanes. Mono, di and triamino functional silanes were found to be effective coagulants for waterborne paint. It was found that monoaminofunctional organosilanes were the most efficacious at detackifying solventborne paint. The preferred organofunctional silanes of the present invention are amino functional silanes. These include (identified hereinafter by the indicated roman numerals):

I 3-aminopropyltriethoxysilane,
II N-2-aminoethyl-3-aminopropyltrimethoxysilane,
III trimethoxysilylpropyldiethylenetriamine,
IV 2-aminoethylenesilane,
V N-(beta-aminoethyl) gamma-aminopropyltrimethoxysilane.

The treatment of the present invention can be enhanced in select environments by the combination of an organofunctional silane and compounds such as inorganic bases, silicates, acids, and metal salts. Preferred examples include: sodium carbonate, calcium nitrate, sodium hydroxide, hydrochloric acid, nitric acid, sulfuric acid, phosphoric acid, sodium disilicate, metasilicate, polyaluminum chloride (PAC), polyaluminum silicate sulfate (PASS), magnesium sulfate or stannic chloride.

The silicates which may be used in combination with the organofunctional silanes of the present invention include: metasilicate $SiO_3^{2-}$, orthosilicate $SiO_4^{4-}$, disilicate $Si_2O_5^{2-}$, mixed silicates $Na_2O \cdot x\ SiO_2$ where $x=3-5$, metaaluminate $Al\ O_2^-$, aluminosilicates $Na_2O \cdot x\ Al_2O_3 \cdot y\ SiO_2$ where $x+y=3-5$. Also effective are: molybdates $MO_7O_{24}^{6-}$, phosphomolybdates $(PO_4)_2 \cdot 12\ MoO_3^{6-}$, and phosphates $PO_4^{3-}$, $P_2O_7^{4-}$.

EXAMPLES

Jar Testing Procedure

A standard jar testing procedure was used to determine the operability of the treatment of the present invention. The general procedure is to add 100 milliliters of tap water to a 120 ml jar. The treatments are added, and the bottle capped and shaken to mix the contents and coat the internal surfaces of the jar with the treated water. 1 ml of paint is added to the jar. After vigorous shaking for 30 seconds, the mixture is observed for signs of coagulation/flocculation with waterborne paints. For solventborne paints, detackification performance was measured by immersing and removing a wooden tongue depressor. The tongue depressor was examined and performance judged, based upon adherence of the paint to the tongue depressor and the jar surfaces based upon the following criteria:

Detackification Criteria For Solution

1. Fail—Paint forms large tacky globules and/or coatings which adhere to the exposed surfaces of the jar and tongue depressor.
2. Poor—Paint forms agglomerates which are slightly tacky or smeary to touch, or upon crushing. Paint sludge coats the tongue depressor.
3. Fair—paint forms granular flocks or globules which adhere to less than 10% of the exposed surface area of the jar or depressor. Sludge may be smeary, but not tacky.
4. Good—Paint forms particles or globules, some of which appear as speaks on less than 1% of the exposed surface area of the jar or depressor. Sludge is neither smeary nor tacky.
5. Excellent—Paint forms particles which do not adhere to the exposed surfaces of the jar or depressor. The paint sludge may float, sink, or be dispersed in the water.

EXAMPLE 1

3-aminopropyltriethoxysilane, N-2-aminoethyl-3-amino-propyltrimethoxysilane, trimethoxysilylpropyl-diethylenetriamine 2-aminoethylenesilane, and N-(beta-aminoethyl) gamma-aminopropyl trimethoxysilane, were jar tested with a waterborne acrylic based resin silver metallic paint. The treatment compound was added in 0.1 ml increments until the onset of coagulation and flocculation was noted. All of the tested compounds were effective in destabilizing the dispersed paint as evidenced by the observation of coagulation and flocculation. Coagulation was judged by the formation of particles and flocculation was judged by the particles ability to agglomerate and to float to the top of the jar. Efficacy was also judged upon the clarity of the water after treatment and the percentage of suspended solids remaining in solution which did not float. The results are summarized in Table 1.

TABLE 1

| Waterborne Paint Coagulation Results | |
|---|---|
| Silane | Treatment Amount |
| I | 2,000–2,400 ppm |
| II | 2,000 ppm |
| III | 1,000 ppm |
| IV | 1,500 ppm |
| V | 700 ppm |

EXAMPLE 2

3-aminopropyltriethoxysilane was jar tested with a solventborne burgundy acrylic resin based paint. The silane alone gave a fair detackification results when used at 50% based on paint. Good detackification was accomplished when the silane was used in combination with sodium carbonate, calcium nitrate, sodium hydroxide, hydrochloric acid, nitric acid, sulfuric acid, phosphoric acid, sodium disilicate, metasilicate, polyaluminum chloride, polyaluminum silicate sulfate, magnesium sulfate or stannic chloride. Table 2 summarizes the results.

TABLE 2

Solventborne Burgundy Acrylic Resin Based Paint

| 3-Aminopropyl-ethoxysilane (ppm) | Compound (ppm) | | Kill |
|---|---|---|---|
| 1000 | — | | Fair |
| 4000 | — | | Good |
| 5000 | — | | Fair to Good |
| 6000 | — | | Good |
| 8000 | — | | Good |
| 10,000 | | | |
| 500 | $Na_2CO_3$ at | 2000 | Fail |
| 1000 | $Na_2CO_3$ at | 250 | Poor |
| 2000 | $Na_2CO_3$ at | 500 | Good to Excellent |
| 2000 | $Na_2CO_3$ at | 2000 | Poor |
| 2000 | $Na_2CO_3$ at | 4400 | Good |
| 3000 | $Na_2CO_3$ at | 6600 | Excellent |
| 4000 | $Na_2CO_3$ at | 2200 | Excellent |
| 5000 | $Na_2CO_3$ at | 220 | Fair |
| 1000 | NaOH at | 75 | Fair |
| 1000 | NaOH at | 50 | Fair to Poor |
| 2000 | NaOH at | 20 | Fair |
| 3000 | NaOH at | 5 | Good |
| 4000 | NaOH at | 75 | Excellent |
| 5000 | NaOH at | 5 | Good to Excellent |
| 2000 | Metasilicate at | 500 | Poor |
| 3000 | Metasilicate at | 500 | Fair |
| 4000 | Metasilicate at | 100 | Fair |
| 4000 | Metasilicate at | 500 | Fair |
| 4000 | Metasilicate at | 1000 | Fail |
| 500 | Disilicate | 10 | Fail |
| 1000 | Disilicate | 200 | Poor |
| 1000 | Disilicate | 400 | Fair |
| 1500 | Disilicate | 400 | Fair |
| 2000 | Disilicate | 200 | Fair |
| 2000 | Disilicate | 400 | Fair |
| 3000 | Disilicate | 20 | Fair to Good |
| 3000 | Disilicate | 80 | Good |
| 3000 | Disilicate | 400 | Fair to Good |
| 4000 | Disilicate | 200 | Good to Excellent |
| 5000 | Disilicate | 200 | Good to Excellent |
| 5000 | Disilicate | 400 | Good |
| 2000 | HCl at | 400 | Fail |
| 5000 | HCl at | 100 | Fair |
| 5000 | HCl at | 200 | Good |
| 1000 | $HNO_3$ at | 10 | Fail |
| 3000 | $HNO_3$ at | 60 | Fail |
| 5000 | $HNO_3$ at | 20 | Good to Excellent |
| 5000 | $HNO_3$ at | 40 | Excellent |
| 5000 | $HNO_3$ at | 100 | Good |
| 2000 | $H_3PO_4$ at | 20 | Poor |
| 3000 | $H_3PO_4$ at | 20 | Good |
| 3000 | $H_3PO_4$ at | 40 | Poor |
| 4000 | $H_3PO_4$ at | 20 | Excellent |
| 2000 | $H_2SO_4$ at | 20 | Poor |
| 3000 | $H_2SO_4$ at | 20 | Excellent |
| 2000 | $CaNO_3$ at | 300 | Fair |
| 3000 | $CaNO_3$ at | 200 | Good to Excellent |
| 3000 | $CaNO_3$ at | 300 | Good |
| 4000 | $CaNO_3$ at | 100 | Excellent |
| 4000 | $CaNO_3$ at | 200 | Excellent |
| 4000 | $CaNO_3$ at | 13,200 | Good to Excellent |
| 5000 | $CaNO_3$ at | 6,600 | Good to Excellent |
| 4000 | $MgSO_4$ at | 200 | Good |
| 5000 | $MgSO_4$ at | 100 | Good |
| 5000 | $Al_2(SO_4)_3$ | 750 | Good |
| 5000 | $Al_2(SO_4)_3$ | 50,000 | Fair to Good |
| 5000 | PASS at | 1000 | Good |
| 5000 | PASS at | 3000 | Excellent |
| 1000 | PAC at | 1000 | Fair |
| 1000 | PAC at | 5000 | Fair to Good |
| 1000 | PAC at | 10,000 | Good to Excellent |
| 1000 | PAC at | 15,000 | Fair to Good |
| 1000 | $SnCl_4$ at | 100 | Fail |
| 1000 | $SnCl_4$ at | 500 | Fail |
| 5000 | $SnCl_4$ at | 100 | Good to Excellent |

The efficacy in these preliminary jar tests appeared to be independent of the order of addition of the silane. A slight residual tackiness remained in many of the combinations which was attributed to slight paint dispersion. The tackiness was easily abated by the introduction of anionic surfactant.

Additional 3-aminopropyltriethoxysilane jar testing was done with three different resin based, solventborne paints. Tested were: a PPG polyester based primer, a PPG epoxy based primer, and a two component polyurethane based clear coat paint from BASF. Good to excellent kill was achieved for all of the combinations listed in Table 3.

TABLE 3

| Paint | Silane I | Compound ($Na_2CO_3$) | Kill |
|---|---|---|---|
| polyester | 5000 ppm | 500 ppm | Good-Excellent |
| epoxy | 5000 ppm | 500 ppm | Good-Excellent |
| polyurethane | 10,000 ppm | 1000 ppm | Good-Excellent |

EXAMPLE 3

2-aminoethylenesilane jar testing was undertaken following the same procedures described in Example 2. The results are summarized in Table 4.

TABLE 4

| Silane IV (ppm) | Compound | Kill |
|---|---|---|
| 1000 | — | Fail |
| 5000 | — | Fair |
| 10,000 | — | Fair |
| 20,000 | — | Fair |
| 10,000 | 200 ppm HCl | Poor |
| 10,000 | 20 ppm HCl | Good Excellent |
| 10,000 | 100 ppm $Na_2CO_3$ | Fail |
| 10,000 | 500 ppm $Na_2CO_3$ | Fail |

Further testing was undertaken in a bench top pilot scale spray booth. The system volume was 15,000 milliliters.

EXAMPLE 4

3-aminopropyltriethoxysilane was tested with a waterborne silver metallic acrylic based paint from DuPont. The jar testing had indicated that approximately 20 to 25% of silane based upon paint was required to coagulate this paint. The system was initially charged with 5 milliliters (3% based upon paint) of the silane. The paint was sprayed at a rate of 3 ml per minute for 5 minutes. Over the 50 minute test, 144.6 milliliters of paint were sprayed and 20 milliliters of silane was added. This converts to a silane usage of 13.8% based upon paint. The silane consistently removed solids from the sump. The coagulated paint particles flocculated quickly and remained floating throughout the run. Water clarity was excellent for the duration of the run. Commonly, dewatering/flotation polymers (emulsions) are required to enhance flotation in such systems. In this trial, such polymers were unnecessary to enhance solids agglomeration.

EXAMPLE 5

3-aminopropyltriethoxysilane was tested with a solventborne gray polyester based primer in a bench top spray booth. The silane was tested in combination with sodium carbonate. The preliminary jar tests indicated that the paint could be detackified with 5,000 ppm of silane and 10,000 ppm sodium carbonate. The paint was sprayed at a rate of 1 milliliter per minute for 70 minutes. Detackification was achieved throughout the run. Silane was used at a rate of 86% based upon paint. No subsequent additions of sodium carbonate were made during the run.

Although the efficacy of the present invention has been demonstrated by a limited number of organosilanes, the skilled artisan will appreciate that numerous organosilanes will prove effective in accordance with the invention for a wide range of paints sprayed in wet paint spray booths.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

We claim:

1. A process for detackifying or coagulating and flocculating waterborne and solventborne paints, lacquers, or enamels in a spray booth in which water is used to wash air in said spray booth for the purpose of removing oversprayed paints, lacquers, or enamels from said water prior to the recirculation of said water for the further washing of air in said spray booth comprising adding to said water a sufficient amount of an organosilane which detackifies or coagulates and flocculates paint, lacquer or enamel in said water.

2. The method of claim 1 wherein said organosilane is added in combination with an inorganic base, acid, or metal salts.

3. The method of claim 2 wherein said inorganic base, acid, or metal salt is selected from the group consisting of sodium carbonate, calcium nitrate, sodium hydroxide, sodium disilicate, metasilicate polyaluminum chloride, polyaluminum silicate sulfate, magnesium sulfate and stannic chloride.

4. The method of claim 1 wherein said organosilane is an aminofunctional silane.

5. The method of claim 4 wherein said aminofunctional silane is a monoaminofunctional silane.

6. The method of claim 4 wherein said aminofunctional silane is selected from the group consisting of:
3-aminopropyltriethoxysilane
N-2-aminoethyl-3-aminopropyltrimethoxysilane
trimethoxysilylpropyldiethylenetriamine
2-aminoethylenesilane
N-(beta-aminoethyl)gamma-aminopropyltrimethoxysilane.

* * * * *